US012625849B2

(12) United States Patent
Jensen et al.

(10) Patent No.: US 12,625,849 B2
(45) Date of Patent: May 12, 2026

(54) SYSTEMS AND METHODS FOR GENERATING A DATA DEFINITION LANGUAGE STATEMENT

(71) Applicant: Rocket Software, Inc., Waltham, MA (US)

(72) Inventors: Tom Ulveman Jensen, Lyngby (DK); Revanth Akella, Spokane, WA (US); Lester Manalastas, Tucson, AZ (US); Rekha Gadikota, Pleasanton, CA (US)

(73) Assignee: Rocket Software, Inc., Waltham, MA (US)

( * ) Notice: Subject to any disclaimer, the term of this patent is extended or adjusted under 35 U.S.C. 154(b) by 0 days.

(21) Appl. No.: 19/004,667

(22) Filed: Dec. 30, 2024

(65) Prior Publication Data

US 2026/0017239 A1 Jan. 15, 2026

Related U.S. Application Data

(60) Provisional application No. 63/669,829, filed on Jul. 11, 2024.

(51) Int. Cl.
*G06F 16/21* (2019.01)

(52) U.S. Cl.
CPC .................................... *G06F 16/21* (2019.01)

(58) Field of Classification Search
CPC ..................................................... G06F 16/21
See application file for complete search history.

(56) References Cited

U.S. PATENT DOCUMENTS

2022/0197900 A1* 6/2022 Maheshwari ..... G06F 16/90324
2024/0330421 A1* 10/2024 Ailawadi ................ G06F 21/31

* cited by examiner

*Primary Examiner* — Ajay M Bhatia
*Assistant Examiner* — Cindy Nguyen
(74) *Attorney, Agent, or Firm* — Danielson Legal LLC

(57) ABSTRACT

Systems and methods for generating a data definition language (DDL) statement for a database management product. The method includes receiving at an interface a partial DDL text input; providing the partial DDL text input to a machine learning model trained on a corpus of DDL statements and configured to analyze the received partial DDL text input and generate a complete DDL statement based on the analysis of the received partial DDL text input and the corpus of DDL statements.

20 Claims, 4 Drawing Sheets

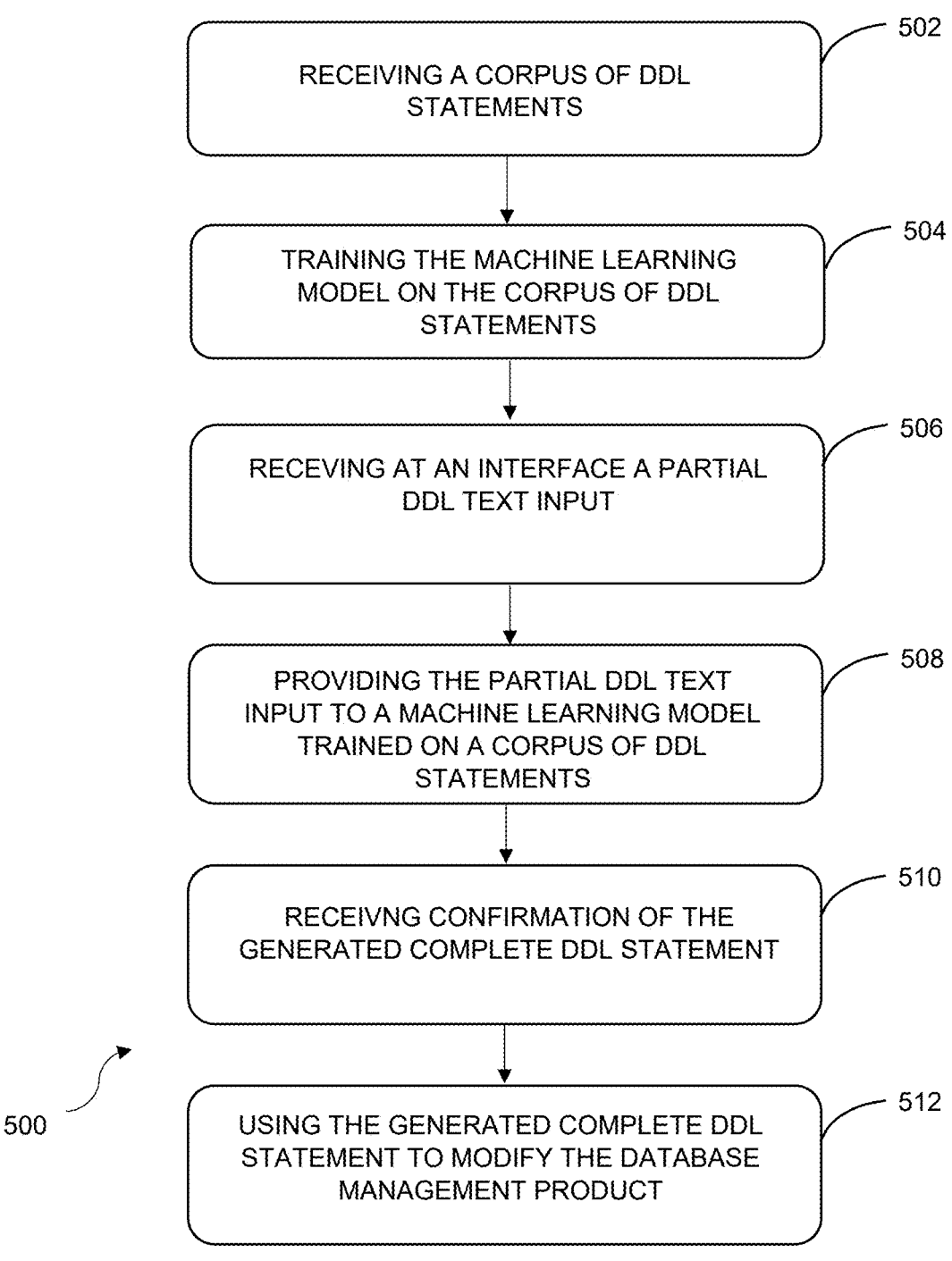

502 — RECEIVING A CORPUS OF DDL STATEMENTS

504 — TRAINING THE MACHINE LEARNING MODEL ON THE CORPUS OF DDL STATEMENTS

506 — RECEVING AT AN INTERFACE A PARTIAL DDL TEXT INPUT

508 — PROVIDING THE PARTIAL DDL TEXT INPUT TO A MACHINE LEARNING MODEL TRAINED ON A CORPUS OF DDL STATEMENTS

510 — RECEIVNG CONFIRMATION OF THE GENERATED COMPLETE DDL STATEMENT

500

512 — USING THE GENERATED COMPLETE DDL STATEMENT TO MODIFY THE DATABASE MANAGEMENT PRODUCT

FIG. 5

SYSTEMS AND METHODS FOR GENERATING A DATA DEFINITION LANGUAGE STATEMENT

CROSS REFERENCE TO RELATED APPLICATIONS

The present application claims the benefit of and priority to U.S. provisional application No. 63/669,829, filed on Jul. 11, 2024, the content of which is hereby incorporated by reference as if set forth in its entirety herein.

TECHNICAL FIELD

Embodiments described herein generally relate to systems and methods for managing network devices and, more particularly but not exclusively, to systems and methods for managing database management products.

BACKGROUND

Organizations, individuals, and other entities rely on the Data Definition Language (DDL) syntax to create or otherwise modify database products or objects thereof. Modifying these objects generally involves using Structured Query Language (SQL) statements. These SQL statements may include instructions to add data to an object associated with a database, modify data of an object, remove data from an object, or the like.

Implementing desired object instruction(s) may involve statements that are hundreds or even thousands of lines of code. For example, an entity such as a bank may have data records or each customer. Each of these records may link multiple accounts associated with the user (e.g., an account associated with their brokerage, their retirement account, etc.). Updating or changing one of these accounts may involve DDL statements that comprise hundreds or thousands of lines of code. Manually generating these DDL statements can be tedious, time-consuming, and susceptible to errors.

A need exists, therefore, for systems and methods that overcome the disadvantages associated with existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a method for generating a data definition language (DDL) statement for a database management product. The method includes receiving at an interface a partial DDL text input; providing the partial DDL text input to a machine learning model trained on a corpus of DDL statements and configured to analyze the received partial DDL text input and generate a complete DDL statement based on the analysis of the received partial DDL text input and the corpus of DDL statements.

In some embodiments, the method further includes receiving the corpus of DDL statements and training the machine learning model on the corpus of DDL statements. In some embodiments, training the machine learning model on the corpus of DDL statements includes separating a sample DDL statement of the corpus into a plurality of object types, creating sequences of tokens representing the objects, and providing the sequences to the machine learning model. In some embodiments, the machine learning model includes a neural network. In some embodiments, one or more processors generate the complete DDL statement by predicting at least one text item to follow the partial DDL text input.

In some embodiments, the method further includes receiving confirmation of the generated complete DDL statement, and using the generated complete DDL statement to modify the database management product.

In some embodiments, the machine learning model is implemented for a mainframe environment. In some embodiments, the machine learning model is implemented for z/OS Interactive System Productivity Facility (ISPF) applications.

According to another aspect, embodiments relate to a system for generating a data definition language (DDL) statement for a database management product. The system includes an interface for at least receiving a partial DDL text input from a user; a database for storing a corpus of DDL statements; and one or more processors executing instructions stored on memory and configured to execute a machine learning model to analyze the corpus of DDL statements, and generate a complete DDL statement based on the analysis of the received partial DDL text input and the corpus of DDL statements, wherein the interface is further configured to present the generated complete DDL statement to the user.

In some embodiments, the one or more processors are further configured to receive the corpus of DDL statements and train the machine learning model on the corpus of DDL statements. In some embodiments, the one or more processors train the machine learning model on the corpus of DDL statements by separating a sample DDL statement of the corpus into a plurality of object types, creating sequences of tokens representing the objects, and providing the sequences to the machine learning model. In some embodiments, the machine learning model includes a neural network. In some embodiments, the one or more processors generate the complete DDL statement by predicting at least one text item to follow the partial DDL text input.

In some embodiments, the interface is further configured to receive confirmation of the generated complete DDL statement, and the one or more processors are further configured to use the generated complete DDL statement to modify the database management product.

In some embodiments, the machine learning is implemented for a mainframe environment. In some embodiments, the machine learning model is implemented for z/OS Interactive System Productivity Facility (ISPF) applications.

According to yet another aspect, embodiments relate to a computer program product for generating a data definition language (DDL) statement for a database management product, the computer program product comprising computer executable code embodied in one or more non-transitory computer readable media that, when executing on one or more processors performs the steps of receiving at an interface a partial DDL text input; providing the partial DDL text input to a machine learning model trained on a corpus of DDL statements and configured to analyze the received partial DDL text input, and generate a complete DDL statement based on the analysis of the received partial DDL text input and the corpus of DDL statements.

In some embodiments, the computer program product further comprises computer executable code that, when executing on the one or more processors, performs the steps of receiving the corpus of DDL statements, and training the machine learning model on the corpus of DDL statements. In some embodiments, training the machine learning model on the plurality of sample DDL statements includes separating a sample DDL statement of the corpus into a plurality of object types, creating sequences of tokens representing the objects, and providing the sequences to the machine learning model.

In some embodiments, the machine learning model includes a neural network.

BRIEF DESCRIPTION OF DRAWINGS

Non-limiting and non-exhaustive embodiments of the invention are described with reference to the following figures, wherein like reference numerals refer to like parts throughout the various views unless otherwise specified.

FIG. 5 depicts a flowchart of a method for generating a DDL statement for a database management product.

DETAILED DESCRIPTION

Figure 1:
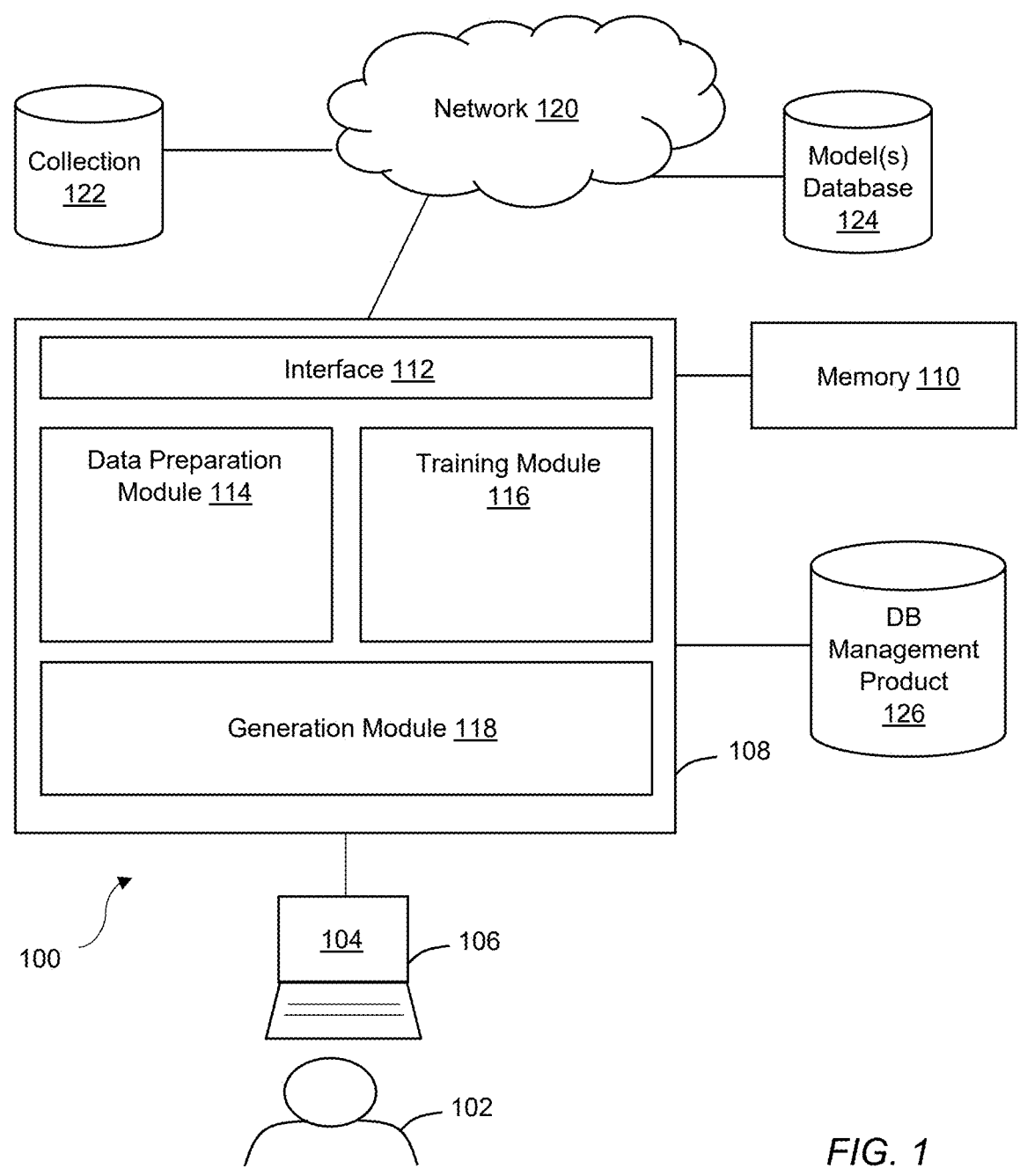
FIG. 1 illustrates a system for generating a data definition language (DDL) statement for a database management product in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

As discussed previously, organizations, individuals, or other types of entities rely on DDL statements to interact with databases or objects thereof. The SQL statements may include instructions to add data to an object, modify data of an object, remove data from an object, or the like. For example, an administrator associated with a banking institution may be tasked with updating records associated with a customer.

Depending on the object, the statement used to modify the object, or both, manually creating the DDL statement may be a time-consuming process and is prone to errors. Additionally, an administrator may make use of the same constructs to generate multiple DDL statements where only a small change is required. These constructs may refer to components in a DDL statement such as the name of an object, the type of an object, command keywords, and other types of attributes.

Different users and different organizations may have preferences or customs regarding how their DDL statements should be written. These customs may involve complex syntax arrangements, which further exacerbate the potential for errors.

The systems and methods described herein provide novel techniques for generating DDL statements. Specifically, the embodiments herein may automatically generate predictions for sequences of a partial DDL statement based on learned syntax and patterns in a collection of existing DDL. Accordingly, the described embodiments obviate the need to continually and manually write DDL statements.

FIG. 1 illustrates a system 100 for generating a DDL statement for a database management product in accordance with one embodiment. A user 102 may access a user interface 104 executing a user device 106. The user 102 may be a network administrator tasked with managing one or more database management products. The user 102 may be tasked with creating a database object (e.g., a table), modifying the object, updating data associated with the object, deleting a portion of the object, truncating the database object, adding comments to the database object, etc., or some combination thereof.

The user device 106 may be any suitable hardware device configured to execute the user interface 104 to accomplish the features of the described embodiments. For example, the user device 206 may be a personal computer (PC), laptop, smartphone, tablet, or any other device whether available now or invented hereafter.

Although FIG. 1 illustrates only one user device 106, the system 100 may include or otherwise be used in conjunction with multiple devices. For example, one particular machine or device may train a model for generating a DDL statement, and another device may subsequently provide a partial DDL statement and access the trained model(s) for generating a complete DDL statement.

The user interface 104 may allow the user 102 to provide a partial DDL statement. The user 102 may provide the partial DDL statement via any suitable input/output (I/O) device, such as a keyboard, touchscreen, microphone, or the like.

The user device 106 may include or otherwise be in operable connectivity with one or more processors 108. The processor(s) 108 may be any hardware device capable of executing instructions stored on memory 110 to provide various components or modules. The processor(s) 108 may include a microprocessor, a field programmable gate array (FPGA), an application-specific integrated circuit (ASIC), or other similar devices.

In some embodiments, such as those relying on one or more ASICs, the functionality described as being provided in part via software may instead be configured into the design of the ASICs and, as such, the associated software may be omitted. The processor 108 may be configured as part of the user device 106 (e.g., a laptop) or located at some remote location.

The memory 110 may be L1, L2, L3 cache, or RAM memory configurations. The memory 110 may include non-volatile memory such as flash memory, EPROM, EEPROM, ROM, and PROM, or volatile memory such as static or dynamic RAM, as discussed above. The exact configuration/type of memory 110 may of course vary as long as instructions for generating a DDL statement for a database management product can be executed. For example, the processor(s) 108 may include or otherwise execute various components such as interface 112, data preparation module 114, a training module 116, and a generation module 118.

The processors(s) 108 may receive data from and communicate data across one or more networks 120. The network(s) 120 may link the various components with various types of network connections. The network(s) 120 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34b is analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network or networks 120 may also comprise, include, or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link. The processor(s) 108 may be in communication over the network(s) 120 with a collection database 1122, a model(s) database 124, and a database management product 126.

The collection database 122 may store a collection of DDL statements, and the model(s) database 124 may store one or more models for generating a DDL statement. The collection database 122 may store DDL statements associated with a particular business entity, for example. The model database 122 may store one or more machine learning models for generating a DDL statement based at least in part on DDL statements stored in the collection database 122.

The generated DDL statements may then update a database management product 126. For example, the database management product 126 may store records associated with a customer of a business entity.

The embodiments described herein may be implemented using components that comply with an industry standard hardware definition. The implementation is not specific to a particular hardware definition. In some embodiments, the systems and methods described herein may be implemented for a mainframe environment. For example, the embodiments herein may be implemented for z/OS.

Figure 2:
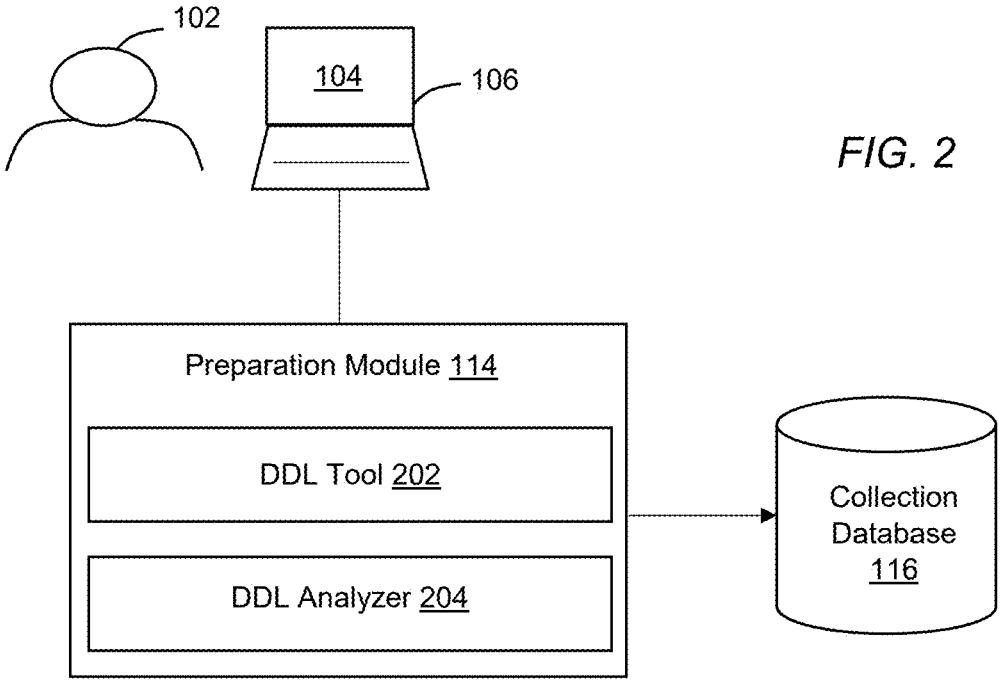
FIG. 2 illustrates the data preparation module of FIG. 1 in accordance with one embodiment.

The user 102 may be tasked with generating DDL statements regarding one or more objects such as databases, tables, functions, views, indexes, sequences, schemas, partitions, or the like. The data preparation module 114 may perform one or more steps associated with generating DDL statements, particularly for training. FIG. 2 illustrates the data preparation module 114 of FIG. 1 in accordance with one embodiment. The user 102 may provide one or more DDL statements as part of a preparation phase. The user 102 may provide these statements over a period of time (e.g., days, weeks, months, years) throughout the normal course of business.

The data preparation module 114 may execute a DDL tool 202 and a DDL analyzer 204. The DDL tool 202 may aid the user 102 in generating a DDL statement, such as a statement of a Db2 object. When the user 102 executes the DDL tool 202, a program extracts DDL statement(s) from the collection database 122 and displays the DDL statement(s) to the user 102 via the user interface 104. Essentially, the DDL tool 202 enables the user 102 to search for database objects, view database objects, execute objects, save objects, etc.

The DDL analyzer 204 may perform any appropriate processing steps on DDL statements such that they can be used to generate predictive models. For example, the DDL analyzer 204 may separate DDL statements into smaller components. In some embodiments, the DDL analyzer 204 may separate DDL statements into parent and child types using "top-to-bottom" relationships. These relationships may define hierarchical connections between database objects. For example, the DDL analyzer 204 may designate a particular database object as a parent, and a tablespace object as a child that is related to the parent database.

The data analyzer 204 may then save these object types in the collection database 122. The stored object types and data regarding their relationship to other data objects may later be used as inputs for creating DDL statements.

Figure 3:
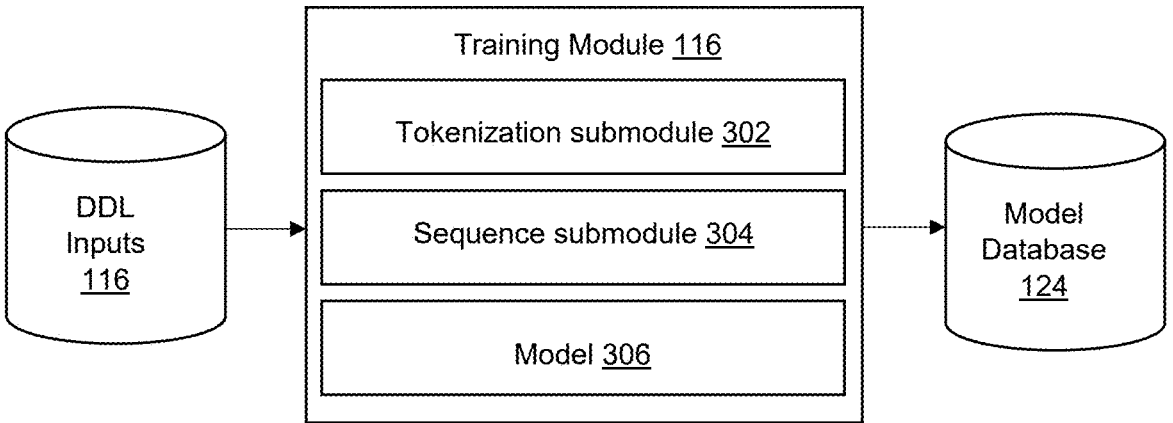
FIG. 3 illustrates the training module of FIG. 1 in accordance with one embodiment.

The training module 116 may train one or more models based at least on the objects stored in the collection database 122. FIG. 3 illustrates the training module 116 in accordance with one embodiment. The training module 116 may include or otherwise execute a tokenization submodule 302, a sequence submodule 304, and one or more models 306.

As part of a model training phase, the tokenization submodule 302 may break down components of DDL statements into individual characters or words (for simplicity, "tokens"). The training module 116 may use these tokens to train the models 306 described herein regarding sequences. In particular, these tokens may be used to train neural network sequences.

The goal of the training phase is to teach the model(s) 306 what token would follow a given series of tokens. The sequence submodule 304 may first create pairs of "current" token groups followed by a "next" token. For example, a DDL of "CREATE DATABSE" may commonly be followed by "DBNAME" among other tokens.

The size of the "current" token groups may vary. In some embodiments, a user may specify a certain size for current token groups. Based on the size specified for each current token group, the model 306 may create associations between a current group and the "next" token.

The model 306 may use a sliding window for identifying relationships between tokens in a sequence. The model 306 may "slide" the window over a set of DDL tokens to identify relationships between tokens.

The sequence submodule 304 generate a set of current tokens with N entries, followed by a set of next tokens with M entries. The sliding window may slide over capture a group of N current tokens, followed by the M next tokens. As the window moves forward, the first token of the current group is removed, and the first of the M next tokens is added to the group. The original second token of the next tokens is now the first token of the next tokens.

The model 306 may be trained for a set number of epochs or rounds. During these training rounds, the model 306 creates weights and biases that are updated as the model 306 trains and validates its training. The saved value of the weights is based on the bias of the model 306. The bias is based on pre-existing data associated with DDL statements, and the weights are variable values that are updated based on the equation $Y=wX+b$; where Y is the next token in a sequence; X, the sequence preceding the token; w, weight, which is updated by the model 306 as it learns the relationship between X and Y; and b, the bias of the particular model.

The training module 116 may train several models with varying attributes. For example, the training module 116 may generate models using different-sized windows, different step sizes for window movements, etc.

The training module 116 may train the models 306 based on output from the sequence-token relationships. Different object types may require or benefit from different sequence lengths. For example, database and tablespace objects may work well with shorter sequences, and models for tables and indexes may need longer sequence lengths as more data needs to be "remembered" for knowing what could come next in a sequence.

Once the model(s) 306 is trained, the embodiments herein may load the model in the model database 124 for subsequence access. The generation module 118 may then access one or more models 306 for analyzing a partial DDL statement and generating a complete DDL statement.

Figure 4:
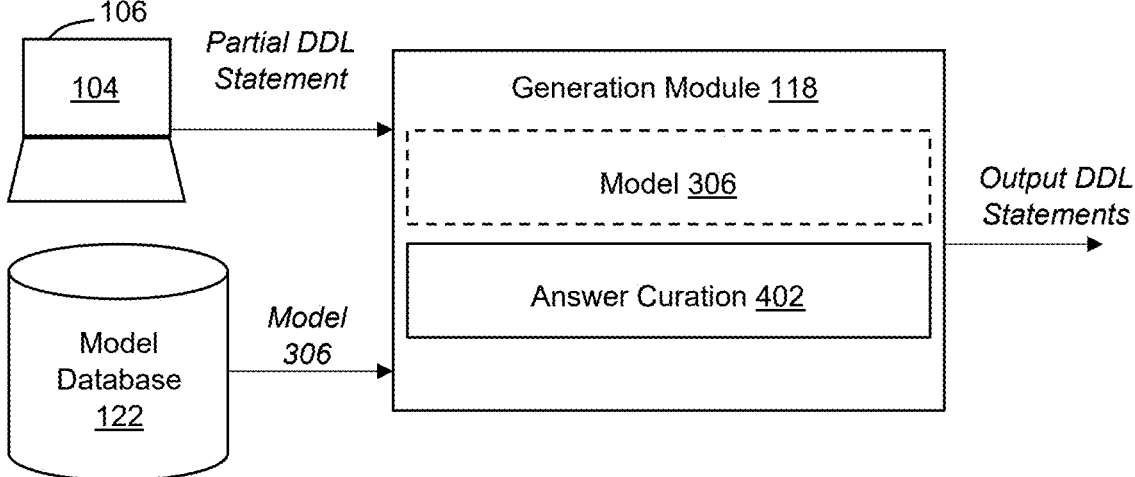
FIG. 4 illustrates the generation module of FIG. 1 in accordance with one embodiment.

FIG. 4 illustrates the generation module 118 of FIG. 1 in accordance with one embodiment. The generation module 118 may load one or more models 306 and execute an answer curation module 402. The generation module 118 may generate a complete DDL statement based on a partial DDL statement received from the user device 106.

In operation, a user such as the user 102 of FIG. 1 may provide a partial DDL statement via the user interface 104. The user providing the partial DDL statement may be the same or different user than the individual providing the training DDL statements.

As an example, the partial DDL statement may be "CREATE DATABASE." The model 306 may leverage the learned association between tokens and generate the next token based on this received text. That is, the model 306 may generate the most likely next token. The previous n tokens become the sequence that is used to iteratively generate the next token. This process may continue until the model 306 reaches the token that represents the last syntactically correct token in a complete DDL statement. For the above input, the model 306 may output "CREATE DATABASE DBNAME BUFFER POOL BP3 INDEX BP4 CCSID EBCDIC STOGROUP SYSDEFLT."

The answer curation module 404 may present the generated DDL statement to the user 102 via the user interface 104. Additionally, the answer curation module 402 may provide supporting documentation for why the model(s) 306 generated the particular DDL statement. The user interface 104 may present the user 102 with an option to view the supporting documentation.

In some embodiments, the answer curation module 402 may also allow the user 102 to provide feedback regarding the generated DLD statement. For example, the user 102 may indicate whether the generated DDL statement is accurate (e.g., the generated DDL statement would perform the intended operation). If the DDL statement is not accurate, the user 102 may provide feedback to the model 306 indicating that the generated DDL statement is not accurate. The user 102 may also correct or otherwise modify the generated DDL statement. Data regarding the user's modification may be stored and used for updating the model 306.

FIG. 5 depicts a flowchart of a method 500 for generating a DDL statement for a database management product in accordance with one embodiment. One or more of the components of FIG. 1 may perform the steps of method 500.

Step 502 involves receiving a corpus of DDL statements. These DDL statements may include actual DDL statements that a business entity has generated through the normal course of business. These statements may be gathered over a period of time such as the past week, month, year, etc. Additionally or alternatively, these DDL statements may include training DDL statements created purely for training a model.

Step 504 involves training a machine learning model on the corpus of DDL statements. For example, the training module 116 of FIG. 1 may train a neural network using tokenized sequence pairs.

Step 506 involves receiving at an interface a partial DDL text input. A user such as a network administrator may be tasked with modifying some aspect of a database management product. For example, the user may need to create a tablespace, edit an attribute of a customer's bank account, remove an entry from the database management product, or the like.

As discussed previously, a complete DDL statement may include hundreds of lines of code. Rather than requiring the user to input a complete DDL statement, the embodiments herein may allow the user to provide only a partial DDL statement.

Step 508 involves providing the partial DDL text input to the machine learning model trained on a corpus of DDL statements. For example, the user may need to provide the first few entries of the DDL statement. The model is configured to analyze the received partial DDL text input, and generate a complete DDL statement based on the analysis of the received partial DDL text input and the corpus of DDL statements. Accordingly, the embodiments herein generate a complete DDL statement as opposed to requiring a user to manually write the DDL statement.

Step 510 involves receiving confirmation of the generated complete DDL statement. For example, a user may provide some form of feedback to indicate whether or not the generated DDL statement is accurate. Step 512 involves using the generated complete DDL statement to modify the database management product.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for generating a data definition language (DDL) statement for a database management product, the method comprising:

receiving at an interface a partial DDL text input;

providing the partial DDL text input to a machine learning model trained on a corpus of DDL statements and trained by:

receiving a plurality of sample DDL statements, identifying an object type associated with each of the sample DDL statements, creating sequences of tokens representing the objects, wherein the length of the sequences is based on the identified object type, and providing the sequences of tokens to the machine learning model for training, wherein the trained machine learning model then analyzes the received partial DDL text input, and generates a complete DDL statement based on the analysis of the received partial DDL text input and the corpus of DDL statements.

2. The method of claim 1 further comprising:

receiving the corpus of DDL statements, and training the machine learning model on the corpus of DDL statements.

3. The method of claim 2 wherein training the machine learning model on the corpus of DDL statements includes:

separating a sample DDL statement of the corpus into a plurality of object types, creating sequences of tokens representing the objects, and providing the sequences to the machine learning model.

4. The method of claim 3 wherein the machine learning model includes a neural network.

5. The method of claim 3 wherein the one or more processors generate the complete DDL statement by predicting at least one text item to follow the partial DDL text input.

6. The method of claim 1 further comprising:

receiving confirmation of the generated complete DDL statement, and using the generated complete DDL statement to modify the database management product.

7. The method of claim 1 wherein the machine learning model is implemented for a mainframe environment.

8. The method of claim 6 wherein the machine learning model is implemented for z/OS Interactive System Productivity Facility (ISPF) applications.

9. A system for generating a data definition language (DDL) statement for a database management product, the system comprising:

an interface for at least receiving a partial DDL text input from a user;

a database for storing a corpus of DDL statements; and one or more processors executing instructions stored on memory and configured to:

execute a machine learning model to analyze the corpus of DDL statements, wherein the machine learning model is trained by:

receiving a plurality of sample DDL statements, identifying an object type associated with each of the sample DDL statements, creating sequences of tokens representing the objects, wherein the length of the sequences is based on the identified object type and the machine learning model is trained on the sequences of tokens, and generate a complete DDL statement based on the analysis of the received partial DDL text input and the corpus of DDL statements, wherein the interface is further configured to present the generated complete DDL statement to the user.

10. The system of claim 9 wherein the one or more processors are further configured to:

receive the corpus of DDL statements, and train the machine learning model on the corpus of DDL statements.

11. The system of claim 10 wherein the one or more processors train the machine learning model on the corpus of DDL statements by:

separating a sample DDL statement of the corpus into a plurality of object types, creating sequences of tokens representing the objects, and providing the sequences to the machine learning model.

12. The system of claim 11 wherein the machine learning model includes a neural network.

13. The system of claim 11 wherein the one or more processors generate the complete DDL statement by predicting at least one text item to follow the partial DDL text input.

14. The system of claim 9 wherein the interface is further configured to receive confirmation of the generated complete DDL statement, and the one or more processors are further configured to use the generated complete DDL statement to modify the database management product.

15. The system of claim 9 wherein the machine learning model is implemented for a mainframe environment.

16. The system of claim 15 wherein the machine learning model is implemented for z/OS Interactive System Productivity Facility (ISPF) applications.

17. A computer program product for generating a data definition language (DDL) statement for a database management product, the computer program product comprising computer executable code embodied in one or more non-transitory computer readable media that, when executing on one or more processors, performs the steps of:

receiving at an interface a partial DDL text input;

providing the partial DDL text input to a machine learning model trained on a corpus of DDL statements and trained by:

receiving a plurality of sample DDL statements, identifying an object type associated with each of the sample DDL statements, creating sequences of tokens representing the objects, wherein the length of the sequences is based on the identified object type, and providing the sequences of tokens to the machine learning model for training, wherein the trained machine learning model then:

analyzes the received partial DDL text input, and generates a complete DDL statement based on the analysis of the received partial DDL text input and the corpus of DDL statements.

18. The computer program product of claim 7 wherein the computer program product further comprises computer executable code that, when executing on the one or more processors, performs the steps of:

receiving the corpus of DDL statements, and training the machine learning model on the corpus of DDL statements.

19. The computer program product of claim 18 wherein training the machine learning model on the plurality of sample DDL statements includes:

separating a sample DDL statement of the corpus into a plurality of object types, creating sequences of tokens representing the objects, and providing the sequences to the machine learning model.

20. The computer program product of claim 17 wherein the machine learning model includes a neural network.

* * * * *